United States Patent
Rieken et al.

[19]

[11] Patent Number: 6,009,154
[45] Date of Patent: Dec. 28, 1999

[54] PROCESS FOR FLEXIBLE RATE CHARGING FOR EXISTING CONNECTIONS

[75] Inventors: Ralf Rieken, Berlin; Renate Zygan-Maus, Munich, both of Germany

[73] Assignee: Siemens Aktiengesellschaft, Munich, Germany

[21] Appl. No.: 08/992,998

[22] Filed: Dec. 18, 1997

Related U.S. Application Data

[63] Continuation of application No. PCT/DE97/00684, Apr. 3, 1997.

[30] Foreign Application Priority Data

Apr. 18, 1996 [DE] Germany ............... 196 15 410

[51] Int. Cl.$^6$ .................................. H04M 15/00
[52] U.S. Cl. .................. 379/114; 379/112; 379/115; 379/130; 379/220; 705/37
[58] Field of Search .................. 379/114, 112, 379/113, 111, 115, 126, 130, 201, 220, 221, 219; 705/37, 34, 1, 10; 455/405, 406, 408

[56] References Cited

U.S. PATENT DOCUMENTS

| | | | |
|---|---|---|---|
| 5,146,491 | 9/1992 | Silver et al. | 379/114 |
| 5,303,297 | 4/1994 | Hillis | 379/114 |
| 5,606,602 | 2/1997 | Johnson et al. | 379/114 |
| 5,675,636 | 10/1997 | Gray | 379/114 |
| 5,802,502 | 9/1998 | Gell et al. | 379/114 |

*Primary Examiner*—Curtis A. Kuntz
*Assistant Examiner*—Rexford N Barnie
*Attorney, Agent, or Firm*—Herbert L. Lerner; Laurence A. Greenberg

[57] ABSTRACT

A process for flexible rate charging for existing connections permits flexible rate charging for services delivered through telecommunication networks. A variable price agreement is accomplished between a service provider and a service user within a predetermined framework, and adherence thereto is checked through the use of an independent verification system.

5 Claims, 3 Drawing Sheets

PROCESS FOR FLEXIBLE RATE CHARGING FOR EXISTING CONNECTIONS

CROSS-REFERENCE TO RELATED APPLICATION

This application is a continuation of International Application Serial No. PCT/DE97/00684, filed Apr. 3, 1997, which designated the United States.

BACKGROUND OF THE INVENTION

1. Field of the Invention

The invention relates to a process for flexible rate charging for a service during an existing connection in a telecommunication network.

Within the scope of the deregulation of telecommunication markets, many different providers are entering the market and are competing with one another in different areas (network operators, service providers, information providers). Clearly, a trend is developing away from the sale of so-called network services such as connections between subscribers, with particular quality characteristics (data rate, error rate, etc.) and toward the marketing of information services such as consulting services, data searches, etc.. Modern telecommunication networks which allow subscribers access to the information providers are oriented, with regard to charging for services, toward characteristics of the connection that is produced (distance, time of day, day of the week, data rate, error rate, etc.). Those parameters that are charge relevant from a network standpoint can be derived by the network at the time that the connection is produced and can be used to determine the rate to be applied.

In the event of the sale of services, e.g. information, consulting, etc. by a service provider to the user of the service, there is a business relationship between the service user and the service provider in addition to the general business relationship between telecommunications subscribers and network operators.

In order to provide a successful marketing of services, the business relationship between the service provider and the user must follow the usual practices of the market:

First of all, that includes a flexible pricing structure as a function of supply and demand, i.e. the provider must be able to adapt its pricing structure to its business interests independently without the inclusion of a third party, e.g. the network operator.

Since the supply is independent of the services of the network operator, within the scope of its business relationship with the user, the service provider should be able to ask its price and when the user is interested, should be able to make the price directly applicable.

It is furthermore required that as needed, the user can remain totally anonymous in relation to the service provider, as is customary, for example, in the purchasing of goods for cash.

For security reasons, e.g. user protection, protection against misuse, the user should be protected against monetary charges brought about by errors and by intentional or unintentional misuse.

The currently used embodiments are based on both of the following approaches:

Online charging according to a predetermined rate schedule. The rate to be applied is derived according to predetermined rules (e.g. from connection parameters or from user inputs having possible variants that are fixed at the beginning of the call). Consequently, only a limited scope is available to the service provider for variable modifications within the framework of an existing connection to a user since the parameters are already fixed at that point.

Offline charging through the use of separate account tendering for the service provided. In that connection, the provider can in fact freely set its price, but the business relationship requires that the user be known to the service provider in order to make the account tendering possible.

SUMMARY OF THE INVENTION

It is accordingly an object of the invention to provide a process for flexible rate charging for existing connections, which overcomes the hereinafore-mentioned disadvantages of the heretofore-known methods of this general type and with which a business relationship between a service provider and a user that is geared to market requirements is possible. This object is attained by broadening signaling used in a network for transmission of rate charging data and introduction of a control system for monitoring, verifying, and displaying the rate charging data.

It is accordingly an object of the invention to provide a process for flexible rate charging for service during an existing connection in a telecommunication network, which comprises requesting a price for a service offered by a service provider, during a connection between the service provider and a service user, by signaling the request in a telecommunication network; sending a signaled rate charging requirement from the network to a verification system for checking; transmitting a level of the rate charged to the service user in the form of an offer; implicitly or explicitly signaling acceptance or refusal of the price requested by the service user; and applying the price agreed upon with the verification system after acknowledgement by the service user.

The process according to the invention permits the flexible signaling of rate charging data from a service provider in the telecommunication network for the sale of services to the user according to standard market procedures. The protection of the user against prices that go beyond a predeterminable framework for various reasons, is realized through the use of a third instance, which exists independently of the service provider. Furthermore, the user has the possibility of declining the price which is requested.

The process according to the invention provides for the fact that an intelligent system is used as a service provider terminal, a PC, a work station, a private branch exchange, a service node, an intelligent peripheral (IP), which is connected with the telecommunication network being used, e.g. ISDN/PSTN. The service provider terminal realizes the service related data exchange with the user and at the proper times signals the payable rate charging data in the network.

The process according to the invention furthermore provides for the fact that the signaling used in the connection region and between the network elements is broadened by reports that permit a flexible pricing structure. The connection to service providers that are equipped with these functions is controlled in the network through the use of a so-called verification system that could be constructed, for example, through the use of a service control point (SCP) of an intelligent network. The verification system has knowledge about the permissible price framework for a given service provider. When a connection is produced, it instructs the network, for example the service switching point (SSP) through which the connection is running, to intercept rate charging data sent by the service provider and to send it to the verification system. The verification system checks the permissibility of the required charge, informs the user when the charges are permissible, and when the user accepts it, applies the charge.

The process according to the invention furthermore provides for the fact that the increased charge in the network is properly indicated. The user pays his or her charges within the framework of his or her contract with the network operator. The service provider is given its percentage from the charges collected by the network operator. In this manner, the anonymity of the user is ensured.

In accordance with another mode of the invention, there is provided a process which comprises realizing the verification system on the basis of components of an intelligent network.

In accordance with a further mode of the invention, there is provided a process which comprises negotiating a transaction between the service user and the service provider with a signaling system of the network.

In accordance with a concomitant mode of the invention, there is provided a process which comprises negotiating a transaction between the service user and the service provider with a user information channel connection.

Other features which are considered as characteristic for the invention are set forth in the appended claims.

Although the invention is illustrated and described herein as embodied in a process for flexible rate charging for existing connections, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
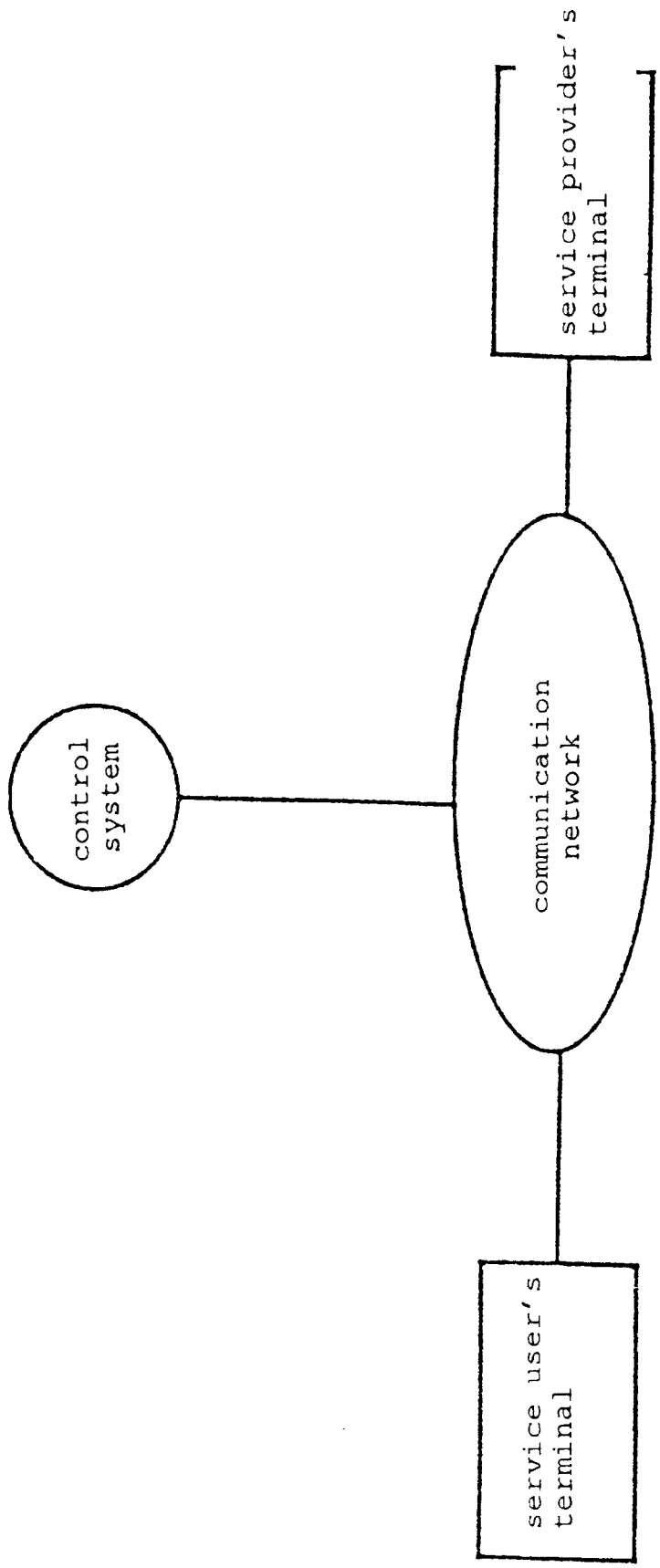
FIG. 1 is a circuit diagram showing a basic configuration of hardware devices for carrying out the present invention.

Referring now to the figures of the drawings in detail and first, particularly, to FIG. 1 thereof, there is seen a diagram showing a basic configuration of hardware devices for carrying out the process according to the present invention. A subscriber terminal of a user, e.g. a telephone or a PC, is connected to a terminal of a service provider, e.g. a telephone, a PC, a work station, a private branch exchange, a service node, or an intelligent peripheral, through a telecommunication network. The service provider offers the user its services through this connection and signals rate charging requirements in the network.

Figure 2:
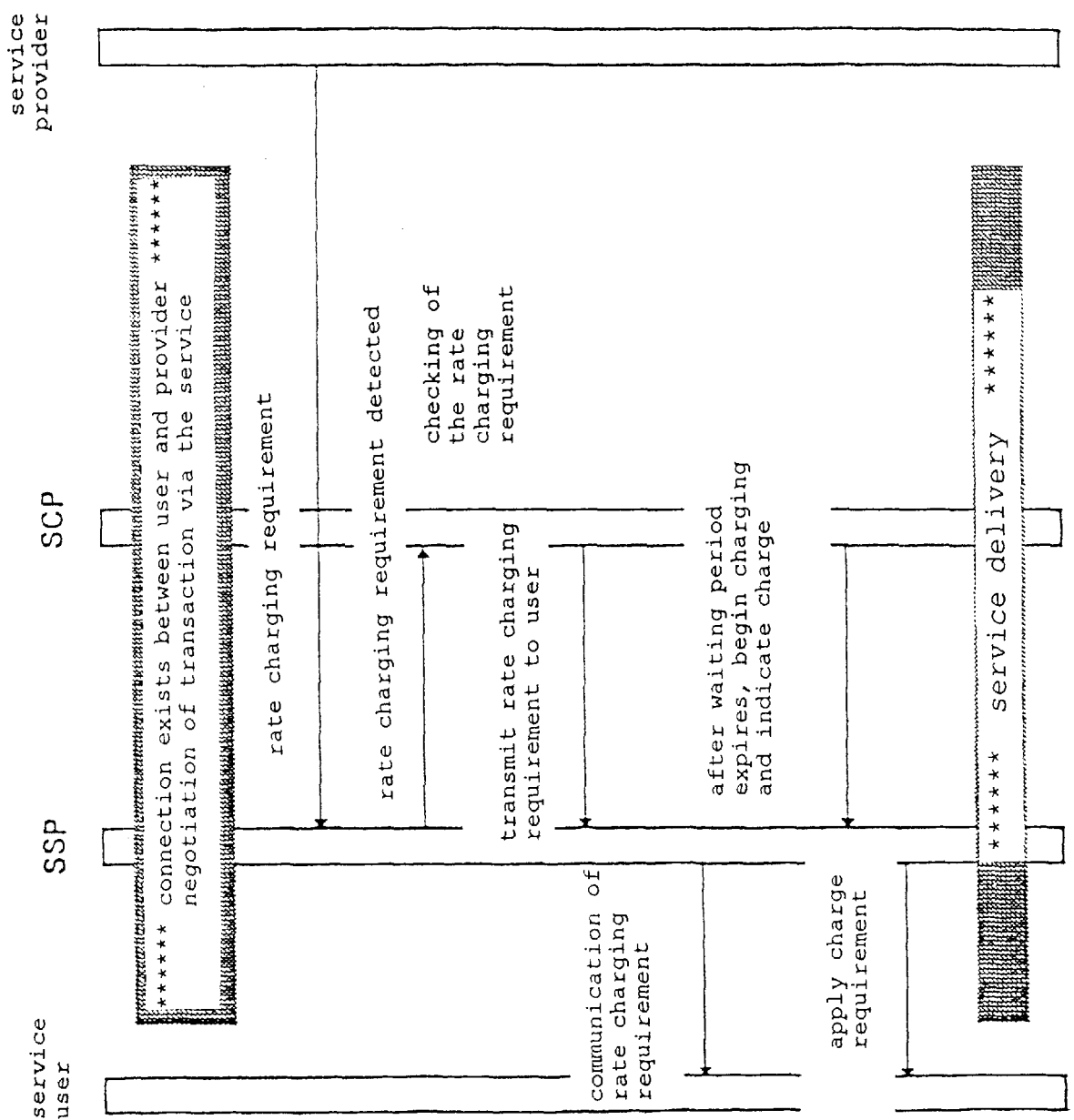
FIG. 2 is a diagram showing a course of communication and signaling of charges.

FIG. 2 is a diagram showing a course of communication and signaling of charges. Rate charging data signaled by the service provider terminal is detected in the network, intercepted, and transmitted to an appropriate control system for this service provider, which is a service control point SSP in the illustrated example. The control system checks the permissibility of the charges, e.g. adherence to a predetermined framework and/or permissible charge increase frequency and/or other parameters connected to the service provider and/or to the user as well.

When the rate charging requirement is permissible, the user is informed within a required period of time as to the charge to be applied. When the user accepts, for example through the use of an explicit signaling or simply through the use of the continued maintenance of the connection, the charge is applied. Parallel to this, the network is instructed to display the increased charge in order to be able to use it later for settling accounts with the service provider.

A refusal by the user is either explicitly signaled or implicitly indicated by the user's breaking of the connection.

The monitoring of the charge reports in the network occurs alternatively through one of the two following processes, which are known from intelligent networks:

- static detection points (trigger detection points), which are established especially for rate charging reports.
- dynamic detection points (event detection points), which are activated upon connection through the use of service logic running on the control system.
- call related user-to-service/service-to-user (UTSI/STUI) signaling.

The rate charge which is required is indicated to the user according to the service currently being used, i.e. through spoken announcement in vocal services or other signaling in data services. The response of the user is transmitted in the network in the same manner. The network handles the appropriate conversion of the signaling in both directions between the control system and the user.

In the event that the required charge rate is applied, the service provider is either explicitly informed in order to then be able to begin the delivery of the service, or the service provider begins to deliver the service after the passage of a definite waiting period which is granted to the user for deciding whether to accept or decline.

The communication course represented in FIG. 2 is based on a completely implicit signaling, i.e. the charge to be applied is announced to the user. After a required period of time has expired, the control system applies the charge and the service provider begins to deliver the service.

Figure 3:
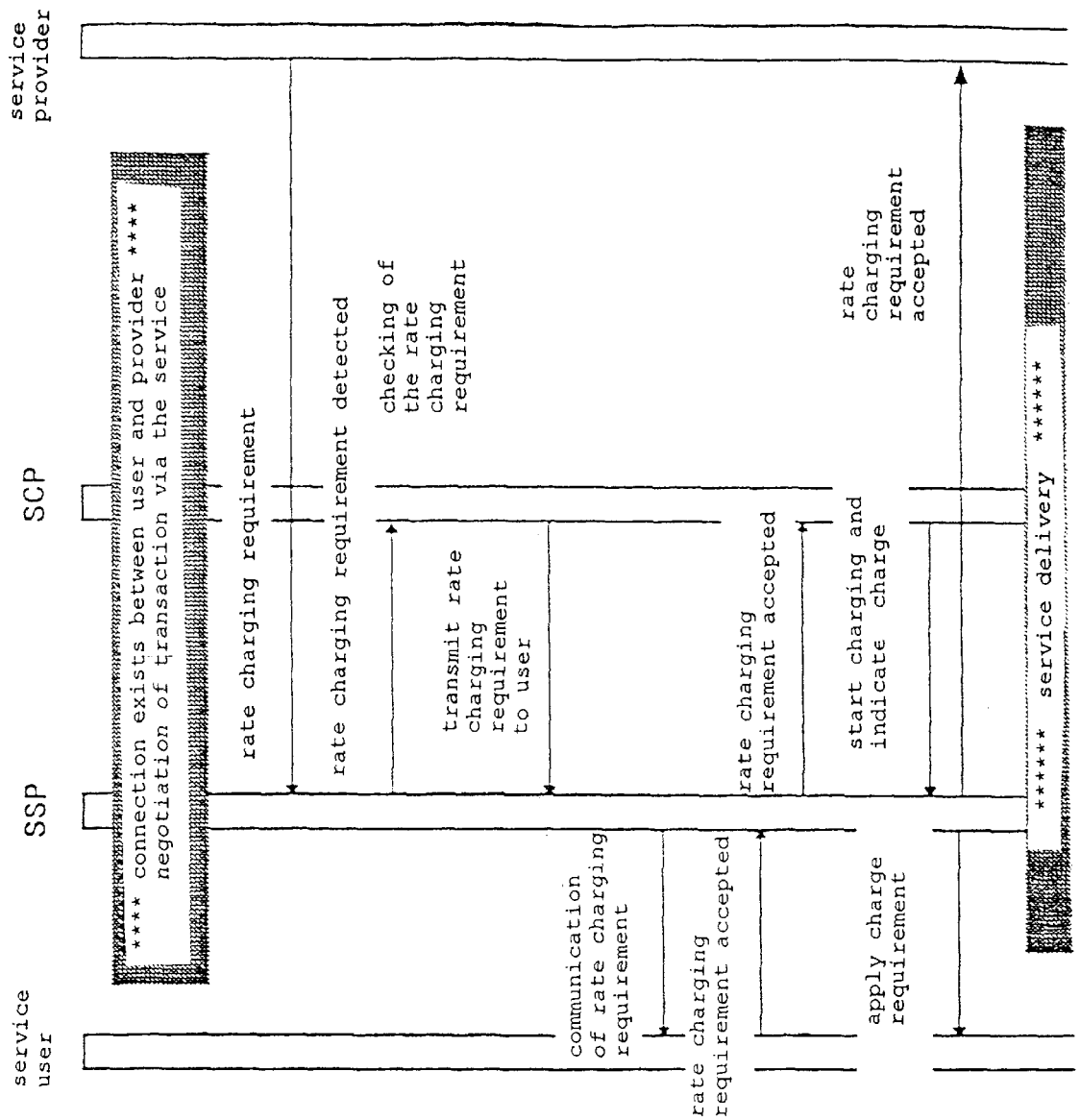
FIG. 3 is a diagram showing a course of explicit signaling of an acceptance of a rate charging requirement.

The course depicted in FIG. 3 shows the explicit signaling of the acceptance of the rate charging requirement. This process permits a minimal time delay within the framework of service delivery, i.e. the service provider can start providing the service for the user immediately after receiving acknowledgement.

We claim:

1. A process for flexible rate charging for service during an existing connection in a telecommunication network, which comprises the following steps:

a) requesting a price for a service offered by a service provider, during a connection between the service provider and a service user, by signaling the request in a telecommunication network;

b) sending a signaled rate charging requirement from the network to a verification system;

c) checking that the signaled rate charging requirement is within a permissible price framework stored in the verification system;

d) if the rate charging requirement is within the permissible price framework stored in the verification system, subsequently transmitting the rate charging requirement to the service user in the form of an offer;

e) implicitly or explicitly signaling acceptance or refusal of the rate charging requirement by the service user; and f) applying the rate charging requirement after acceptance by the service user.

2. The process according to claim 1, which comprises realizing the verification system on the basis of components of an intelligent network.

3. The process according to claim 1, which comprises negotiating a transaction between the service user and the service provider with a signaling system of the network.

4. The process according to claim 1, which comprises negotiating a transaction between the service user and the service provider with a user information channel connection.

5. The process according to claim 1, which further comprises using the verification system to perform the step of applying the rate charging requirement after acceptance by the service user.

* * * * *